United States Patent
Ikeda et al.

(10) Patent No.: US 10,858,487 B2
(45) Date of Patent: Dec. 8, 2020

(54) POLYTETRAFLUOROETHYLENE FORMED PRODUCT, AND MANUFACTURING METHOD THEREFOR

(71) Applicants: SUMITOMO ELECTRIC FINE POLYMER, INC., Osaka (JP); DAIKIN INDUSTRIES, LTD., Osaka (JP)

(72) Inventors: Kazuaki Ikeda, Osaka (JP); Hong-Phuc Nguyen, Osaka (JP); Hirotoshi Yoshida, Settsu (JP); Taku Yamanaka, Settsu (JP)

(73) Assignees: SUMITOMO ELECTRIC FINE POLYMER, INC., Osaka (JP); DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/757,690

(22) PCT Filed: Aug. 30, 2016

(86) PCT No.: PCT/JP2016/075326
§ 371 (c)(1),
(2) Date: Mar. 6, 2018

(87) PCT Pub. No.: WO2017/043371
PCT Pub. Date: Mar. 16, 2017

(65) Prior Publication Data
US 2019/0040212 A1  Feb. 7, 2019

(30) Foreign Application Priority Data
Sep. 7, 2015 (JP) .................... 2015-176198

(51) Int. Cl.
*C08F 2/46* (2006.01)
*C08F 2/50* (2006.01)
*C08G 61/04* (2006.01)
*C08J 3/28* (2006.01)
*C08J 7/12* (2006.01)
*B05D 3/02* (2006.01)
*B05D 3/04* (2006.01)
*C08J 3/24* (2006.01)
*B05D 3/06* (2006.01)
*B05D 5/08* (2006.01)
*C09D 127/16* (2006.01)
*B29C 35/08* (2006.01)
*C08F 14/26* (2006.01)
*C08J 5/18* (2006.01)
*B29K 27/18* (2006.01)

(52) U.S. Cl.
CPC .............. *C08J 3/28* (2013.01); *B05D 3/0254* (2013.01); *B05D 3/0486* (2013.01); *B05D 3/068* (2013.01); *B05D 5/083* (2013.01); *B29C 35/0866* (2013.01); *C08F 14/26* (2013.01); *C08J 3/24* (2013.01); *C08J 3/247* (2013.01); *C08J 5/18* (2013.01); *C08J 7/123* (2013.01); *C09D 127/16* (2013.01); *B29C 2035/0872* (2013.01); *B29K 2027/18* (2013.01); *C08F 2810/20* (2013.01); *C08J 2327/18* (2013.01); *C08J 2327/22* (2013.01)

(58) Field of Classification Search
CPC ....... C08J 3/28; C08J 3/247; C08J 5/18; C08J 5/00; C08J 7/00; C08J 2327/22; C08F 14/26; C08F 2810/20; B29K 2027/18; B29C 35/0866; B29C 2035/0872; B29C 35/08
USPC .................... 522/156, 155, 150, 1; 520/1
See application file for complete search history.

(56) References Cited

U.S. PATENT DOCUMENTS

| 3,116,226 A | 12/1963 | Bowers |
| 2009/0281231 A1 | 11/2009 | Kasai et al. |
| 2013/0122302 A1 | 5/2013 | Miyamoto et al. |
| 2015/0307800 A1* | 10/2015 | Yoshida ................ F16C 33/201 508/106 |

FOREIGN PATENT DOCUMENTS

| CN | 102153852 | * 12/2012 | |
| JP | H06-116423 A | 4/1994 | |
| JP | H08-339809 A | 12/1996 | |
| JP | H09-278907 A | 10/1997 | |
| JP | H09-316266 A | 12/1997 | |
| JP | H10-147617 A | 6/1998 | |
| JP | 2002-80672 A | 3/2002 | |
| JP | 2002-114882 A | 4/2002 | |
| JP | 2003-183412 A | 7/2003 | |
| JP | 2005-105057 A | 4/2005 | |
| JP | 2011-208102 A | 10/2011 | |
| JP | 2011-208803 A | 10/2011 | |
| JP | 2013-528663 A | 7/2013 | |
| WO | WO-2005/061567 A1 | 7/2005 | |
| WO | WO-2007/119829 A1 | 10/2007 | |
| WO | WO-2014083978 A1 * | 6/2014 | ............ F16C 33/201 |

OTHER PUBLICATIONS

Lin et al, CN 102153852 Machine Translation, Dec. 19, 2012.*

* cited by examiner

Primary Examiner — Jessica Whiteley
(74) Attorney, Agent, or Firm — Faegre Drinker Biddle & Reath LLP

(57) ABSTRACT

A polytetrafluoroethylene formed product according to an aspect of the invention contains, as a principal component, a polytetrafluoroethylene having a crosslinked structure and has a PV limit of not less than 1600 MPa·m/min.

14 Claims, No Drawings

POLYTETRAFLUOROETHYLENE FORMED PRODUCT, AND MANUFACTURING METHOD THEREFOR

TECHNICAL FIELD

The present invention relates to a polytetrafluoroethylene formed product and a manufacturing method therefor.

BACKGROUND ART

As means for improving the mechanical strength such as wear resistance of a polytetrafluoroethylene (PTFE), a technique to irradiate a coating film or the like of a PTFE with ionizing radiation has been known (see Japanese Laid-Open Patent Publication No. H6-116423 and Japanese Laid-Open Patent Publication No. H9-278907). In such a case of irradiation with ionizing radiation, a high-molecular weight PTFE having an average molecular weight exceeding 600 thousand is used for providing sufficient mechanical strength due to entanglement of molecules. On the other hand, for example, a low-molecular weight PTFE having a number average molecular weight of not greater than 600 thousand is used as an additive for improving slidability or the texture of a coating film surface, or the like (see Japanese Laid-Open Patent Publication No. H10-147617).

CITATION LIST

Patent Literature

PATENT LITERATURE 1: Japanese Laid-Open Patent Publication No. H6-116423
PATENT LITERATURE 2: Japanese Laid-Open Patent Publication No. H9-278907
PATENT LITERATURE 3: Japanese Laid-Open Patent Publication No. H10-147617
PATENT LITERATURE 4: Japanese Laid-Open Patent Publication No. H8-339809
PATENT LITERATURE 5: Japanese Translation of PCT International Application No. 2013-528663
PATENT LITERATURE 6: International Publication No. WO2005-061567
PATENT LITERATURE 7: International Publication No. WO2007-119829

SUMMARY OF INVENTION

Technical Problem

However, at the present day when higher performance and greater functionality of various materials are desired, materials having more excellent wear resistance and the like are desired for sliding members.

The present invention has been made based on the above-described circumstances, and an object of the present invention is to provide: a polytetrafluoroethylene formed product suitable as a sliding member and the like; and a manufacturing method therefor.

Solution to Problem

A polytetrafluoroethylene formed product according to an aspect of the invention that has been made to solve the above problem is a polytetrafluoroethylene formed product containing, as a principal component, a polytetrafluoroethylene having a crosslinked structure, and has a PV limit of not less than 1600 MPa·m/min.

A manufacturing method for a polytetrafluoroethylene formed product according to another aspect of the present invention that has been made to solve the above problem is a manufacturing method for a polytetrafluoroethylene formed product, the method including an irradiation step of irradiating a forming material containing a polytetrafluoroethylene as a principal component with ionizing radiation under a condition of no oxygen and of a temperature equal to or higher than a crystalline melting point of the polytetrafluoroethylene; wherein the polytetrafluoroethylene has a melt viscosity at 380° C. of not greater than $7 \times 10^5$ Pa·s, and the polytetrafluoroethylene formed product has a PV limit of not less than 1600 MPa·m/min.

Advantageous Effects of Invention

According to the present invention, it is possible to provide: a polytetrafluoroethylene formed product suitable as a sliding member and the like; and a manufacturing method therefor.

DESCRIPTION OF EMBODIMENTS

Description of Embodiment of Present Invention

A polytetrafluoroethylene (PTFE) formed product according to an aspect of the present invention contains, as a principal component, a PTFE having a crosslinked structure, and has a PV limit of not less than 1600 MPa·m/min.

The PTFE formed product has a PV limit of not less than 1600 MPa·m/min and thus has higher wear resistance than a conventional PTFE formed product. Therefore, the PTFE formed product can be suitably used as a sliding member and the like.

The PV limit of the PTFE formed product is preferably not greater than 2500 MPa·m/min. Such a PTFE formed product can be effectively manufactured by irradiation of a material containing the PTFE with ionizing radiation, and has excellent productivity and the like.

The pencil hardness of the PTFE formed product is preferably not less than HB. Since the PTFE formed product has such a high hardness, the usefulness of the PTFE formed product as a sliding member and the like is further enhanced.

The elongation at break of the PTFE formed product is preferably not less than 100%. When the elongation at break of the PTFE formed product is high as described above, the usefulness of the PTFE formed product as a sliding member and the like is further enhanced.

The PTFE formed product can be suitably used as a sliding member. The sliding member for which the PTFE formed product having excellent wear resistance is used can exhibit high durability and the like.

A manufacturing method for a PTFE formed product according to an aspect of the present invention is a manufacturing method for a PTFE formed product, the method including a step of irradiating a forming material containing a PTFE as a principal component with ionizing radiation under a condition of no oxygen and of a temperature equal to or higher than the crystalline melting point of the PTFE; wherein the PTFE has a melt viscosity at 380° C. of not greater than $7 \times 10^5$ Pa·s and the PTFE formed product has a PV limit of not less than 1600 MPa m/min.

According to the manufacturing method, a PTFE formed product having excellent wear resistance can be obtained by irradiating a forming material containing, as a principal component, a PTFE having a low melt viscosity, that is, having a low molecular weight, with ionizing radiation.

The number average molecular weight of the PTFE is preferably not greater than 600 thousand. A PTFE formed product having more excellent wear resistance can be obtained by using such a PTFE having a low molecular weight.

Here, the "principal component" means a component contained in the largest amount, for example, a component contained in an amount of not less than 50 mass %. The "PV limit" is a value measured according to the A method (ring-on-disk type thrust abrasion test) in JIS-K-7218 (1986) except for using a ring having an outer diameter of 11.6 mm and an inner diameter of 7.4 mm as a mating material, under a constant speed condition while changing the pressure. The "pencil hardness" is a value measured according to JIS-K-5600-5-4 (1999). The "elongation at break" is a value measured according to JIS-K-7161 (1994).

DETAILS OF EMBODIMENT OF PRESENT INVENTION

Hereinafter, a PTFE formed product and a manufacturing method therefor according to an embodiment of the present invention will be described in detail.

<PTFE Formed Product>

The PTFE formed product according to the embodiment of the present invention is a PTFE formed product that contains, as a principal component, a PTFE having a cross-linked structure (hereinafter, also referred to as "crosslinked PTFE") and that has a PV limit of not less than 1600 MPa·m/min. As described later, the crosslinked PTFE can be suitably obtained by irradiating an uncrosslinked PTFE with ionizing radiation under a condition of no oxygen and of a temperature equal to or higher than the crystalline melting point of the PTFE.

The lower limit of the contained amount of the crosslinked PTFE in the PTFE formed product is preferably 50 mass % and more preferably 55 mass %. In addition, the lower limit may be 60 mass %, may be 80 mass %, or may be 90 mass %. When the contained amount of the crosslinked PTFE is less than the lower limit, excellent wear resistance based on the crosslinked PTFE cannot be exhibited in some cases. On the other hand, the upper limit of the contained amount of the crosslinked PTFE in the PTFE formed product may be 100 mass %, but may be 90 mass %, may be 80 mass %, or may be 70 mass %.

The lower limit of the contained amount of the crosslinked PTFE in the entire polymer component in the PTFE formed product is preferably 50 mass %, more preferably 70 mass %, and further preferably 90 mass %. When the contained amount of the crosslinked PTFE in the entire polymer component is not less than the lower limit, more excellent wear resistance can be exhibited. On the other hand, the upper limit of the contained amount of the crosslinked PTFE in the entire polymer component may be 100 mass % or may be 90 mass %.

Examples of components that may be contained in the PTFE formed product in addition to the crosslinked PTFE include another polymer component, a film forming aid, an antifoaming agent, a filler, a pigment, and a flame retardant. Examples of the filler include carbon, graphite, glass fiber, and super engineering plastics.

The lower limit of the PV limit (a value measured under a constant speed condition) of the PTFE formed product is 1600 MPa·m/min, preferably 1700 MPa·m/min, more preferably 1800 MPa·m/min, and further preferably 1900 MPa·m/min. On the other hand, the upper limit of the PV limit is preferably 2500 MPa·m/min, more preferably 2200 MPa·m/min, and further preferably 2000 MPa·m/min.

Since the PTFE formed product has a PV limit not less than the lower limit, the PTFE formed product has higher wear resistance than a conventional PTFE formed product. Thus, the PTFE formed product can be suitably used as a sliding member and the like. On the other hand, when the PV limit of the PTFE formed product exceeds the upper limit, the productivity by the irradiation of the material containing the PTFE with the ionizing radiation may decrease.

The pencil hardness of the PTFE formed product is preferably not less than HB and more preferably not less than F. When the PTFE formed product has a high hardness as described above, the usefulness of the PTFE formed product as a sliding member and the like is enhanced. On the other hand, the pencil hardness may be, for example, not greater than H. When the pencil hardness of the PTFE formed product exceeds H, the productivity of such a PTFE formed product may decrease.

The lower limit of the elongation at break (tensile elongation at break) of the PTFE formed product is preferably 100% and more preferably 140%. When the elongation at break of the PTFE formed product is high as described above, the mechanical strength of the PTFE formed product is further enhanced, and thus the usefulness of the PTFE formed product as a sliding member and the like is further enhanced. On the other hand, the upper limit of the elongation at break of the PTFE formed product is, for example, 300% and preferably 250%. When the elongation at break of the PTFE formed product exceeds the upper limit, the productivity or the wear resistance or the like of such a PTFE formed product may decrease.

The lower limit of the breaking strength (tensile breaking strength) of the PTFE formed product is preferably 0.5 kg/mm$^2$ and more preferably 1 kg/mm$^2$. When the breaking strength of the PTFE formed product is high as described above, the mechanical strength of the PTFE formed product is further enhanced, and thus the usefulness of the PTFE formed product as a sliding member and the like is further enhanced. The breaking strength is a value measured according to JIS-K-7161 (1994).

The PTFE formed product has excellent rub resistance and the like, and thus can be suitably used as sliding members for vehicles, machine tools, home electric appliances, and the like. Examples of specific sliding members include bearings, gears, crankshafts, slide bearings, pistons, gaskets, conveyance rollers, and pressure rollers. The PTFE formed product may be provided as a cover layer in each of these sliding members, or the entireties of these sliding members may be formed from the PTFE formed product. The shape of the PTFE formed product is not particularly limited, and may be a film shape or may be a shape obtained by forming into the shape of a specific sliding member or the like.

<Manufacturing Method for PTFE Formed Product>

The aforementioned PTFE formed product having a PV limit of not less than 1600 MPa·m/min can be suitably obtained by the following method. That is, the manufacturing method for the PTFE formed product according to the embodiment of the present invention is a manufacturing method for a PTFE formed product, including an irradiation step of irradiating a forming material containing a PTFE as a principal component with ionizing radiation under a condition of no oxygen and of a temperature equal to or higher than the crystalline melting point of the PTFE, wherein the PTFE has a melt viscosity at 380° C. of not greater than 7×10$^5$ Pa·s, and the PTFE formed product has a PV limit of not less than 1600 MPa·m/min.

According to the manufacturing method, a PTFE formed product having excellent wear resistance can be obtained by irradiating a forming material containing, as a principal component, a PTFE having a low melt viscosity, that is, a low molecular weight, with ionizing radiation. The reason for this is uncertain, but it is speculated that by using a PTFE having relatively short molecular chains, a crosslinked structure in which the molecular chains are intricately entangled with each other is formed during crosslinked structure formation by irradiation with ionizing radiation, and the mechanical strength further improves due to the intricate entanglement of the molecular chains. Also since no difference from the case of using a high-molecular weight PTFE is observed in an NMR spectrum, the crosslinked structure and the crosslink density are similar to those in the case, but it is speculated that a difference in entanglement of molecular chains from the case is produced.

The forming material contains the PTFE as a principal component. The form of the PTFE is not particularly limited, but can normally be particles. The form of the forming material may be powder, a solution, a dispersion (slurry), or the like, but is not particularly limited.

The PTFE maybe a homo PTFE or may be a modified PTFE. The homo PTFE refers to a homopolymer of tetrafluoroethylene. The modified PTFE refers to a copolymer of tetrafluoroethylene and a monomer other than tetrafluoroethylene (also referred to as "modified monomer". The upper limit of the content of a structural unit derived from the modified monomer in the modified PTFE is preferably 1 mass % and more preferably 0.5 mass %. As the modified monomer, a publicly known monomer can be used, and one type may be used, or two or more types may be used.

A manufacturing method for the PTFE that is a material is not particularly limited. For example, a PTFE having a desired melt viscosity can be suitably obtained by publicly known emulsion polymerization or the like. Specifically, the emulsion polymerization can be carried out by performing emulsion polymerization of tetrafluoroethylene (TFE) in the presence of an aqueous dispersion medium, a surfactant, and a radical polymerization initiator. As the PTFE, a commercially available PTFE can also be used. In addition, as the PTFE, a PTFE modified such that the advantageous effects of the present invention are not impaired may be used.

The aqueous dispersion medium refers to water or a mixed dispersion medium of water and an aqueous organic dispersion medium (alcohol or the like). As the aqueous dispersion medium, water is preferable.

As the surfactant, fluorine-containing surfactants, such as perfluoroalkyl carboxylic acids and salts thereof, and fluorine-containing sulfonic acids and salts thereof, are preferable. Specific examples of the perfluoroalkyl carboxylic acids include perfluorohexanoic acid, perfluoroheptanoic acid, perfluorooctanoic acid, and perfluorononanoic acid. Specific examples of the fluorine-containing sulfonic acids include perfluorooctane sulfonic acid. Specific examples of the salts of these acids include alkali metal salts such as lithium salts, sodium salts, and potassium salts, and ammonium salts.

Examples of the radical polymerization initiator include persulfates such as ammonium persulfate and potassium persulfate, and water-soluble organic peroxides such as disuccinic acid peroxide and tert-butyl hydroperoxide.

During the polymerization, a chain transfer agent is preferably used for controlling the molecular weight (melt viscosity) of a PTFE to be obtained. For example, a PTFE having a lower molecular weight can be obtained by increasing the amount of the chain transfer agent to be used. Examples of the chain transfer agent include saturated hydrocarbons such as methane, ethane, propane, and butane, halogenated saturated hydrocarbons such as chloromethane, dichloromethane, and difluoroethane, and alcohols such as methanol and ethanol.

During the polymerization, an emulsion stabilizer such as paraffin wax, and a pH adjuster such as ammonium carbonate, can also be used as necessary.

The PTFE obtained by such emulsion polymerization or the like may be used as a dispersion or may be used as a dried powder. In the case where the PTFE is in the form of particles, the average primary particle diameter of the PTFE can be, for example, not less than 0.1 µm and not greater than 0.5 µm. The average primary particle diameter is a value measured by a method described in EXAMPLES.

The upper limit of the melt viscosity at 380° C. of the PTFE is 7×10$^5$ Pa·s, preferably 6×10$^5$ Pa·s, and more preferably 5×10$^5$ Pa·s. On the other hand, the lower limit of the melt viscosity at 380° C. of the PTFE is preferably 1×10$^2$ Pa·s, more preferably 1×10$^3$ Pa·s, further preferably 1×10$^4$ Pa·s, and particularly preferably 1×10$^5$ Pa·s. When the melt viscosity of the PTFE that has not been irradiated exceeds the upper limit, a formed product having excellent wear resistance cannot be obtained in some cases. On the other hand, when the melt viscosity is less than the lower limit, the amount of a volatile component at high temperature is increased, and thus volatilization is likely to occur during the irradiation with the ionizing radiation, baking (thermal treatment) before the irradiation, or the like. In addition, the forming material or the obtained formed product may be colored.

Hereinafter, methods for measuring the melt viscosity of the PTFE will be described.

(Method X)

The melt viscosity at 380° C. of the PTFE is a value measured by a method X described below. First, a formed product is produced as a sample by the following procedure. Three grams of a powdered PTFE is filled into a cylindrical mold having an inner diameter of 30 mm and is compressed until a final pressure becomes 30 MPa. By keeping the compression under 30 MPa for 2 minutes, a sample is obtained as a disk-shaped formed product (diameter: 30 mm, thickness: about 2 mm). The obtained sample is taken out from the mold, is cut out into a disk shape having a diameter of 27 mm, and then is held between 25 mm-diameter parallel plates of a test stand of "Rheometer MCR500" manufactured by Anton Paar. The sample is kept at 380° C. for 5 minutes while being held. Thereafter, the distance between the plates is adjusted to 1.5 mm, and a portion of the sample that protrudes from the plates is removed, and the sample is kept at 380° C. for 30 minutes until stress on the sample is sufficiently alleviated. A melt viscosity at 380° C. is measured in a vibration mode in which an amount of deformation at the measurement is 0.2% and a shear rate is 0.1 (1/s). In the case of the parallel plates, the amount of deformation at the measurement is the ratio of the vibration amplitude of the outermost peripheries of the parallel plates relative to the sample thickness.

(Method Y)

The melt viscosity of the PTFE can also be measured by a method Y described below. Also in EXAMPLES, it is shown that a value measured by the method X and a value measured by the method Y are substantially equal to each other (see a PTFE powder A in Table 1).

The method Y is a measurement method that conforms to ASTM D 1238. Specifically, measurement can be performed, by using a 2φ-8L die and a flow tester manufactured by Shimadzu Corporation, while 2 g of a sample that has been preheated at a measurement temperature (380° C.) for 5 minutes, is kept at this temperature under a load of 0.7 MPa.

(Method Z)

Meanwhile, the melt viscosity of a high-molecular weight PTFE that does not flow in a molten state can be obtained by a method Z in which a melt viscosity is obtained from elongation (creep) in a molten state by thermomechanical analysis (TMA) described below. Specifically, a (specific) melt viscosity can be obtained by carrying out a creep test by the following procedure using a solid viscoelasticity spectrometer ("EXSTAR 6000DMS" manufactured by SII Nano Technology Inc.).

First, a sample is produced by the following method. Eighty grams of a powder is filled into a cylindrical mold having an inner diameter of 50 mm, and pressure is gradually applied thereto for about 30 seconds such that a final pressure becomes about 352 kg/cm². After keeping the final pressure for 2 minutes, a formed product is taken out from the mold. The obtained cylindrical formed product (diameter: 50 mm) is baked in an air electric furnace heated at 371° C., for 90 minutes, and the temperature is subsequently decreased to 250° C. at a rate of 1° C./min. After keeping 250° C. for 30 minutes, a baked body is taken out from the inside of the furnace. Next, the obtained cylindrical baked body is processed by cutting along a side surface thereof to obtain a band-shaped sheet having a thickness of 0.50 mm. A small piece having a width of 5 mm and a length of 15 mm is cut out from the obtained band-shaped sheet, the width and the thickness of the small piece are accurately measured, and a cross-sectional area of the small piece is calculated. Next, sample attachment metal fittings are attached to both ends of the small piece (sample) such that the distance therebetween is 1.0 cm. Furthermore, the metal-sample assembly is put into a cylindrical furnace, and the temperature is increased from room temperature to 380° C. at a rate of 20° C./min. After keeping the temperature for about 5 minutes, a load of about 15 g is applied to the sample. From a curve of elongation change over time, an elongation between 60 minutes to 120 minutes after the load application is read, and the ratio of the elongation relative to the time (60 min) is obtained. A (specific) melt viscosity (η) can be calculated from the following relational expression.

$$\eta = \frac{W \times Lr \times g}{3 \times (dLr/dT) \times Ar} \quad [\text{Math. 1}]$$

In the above expression, W represents a tensile load (g), Lr represents the length (cm) of the sample at 380° C., "g" represents the constant of gravity (980 cm/sec²), dLr/dT represents the ratio (cm/sec) of the elongation between 60 minutes and 120 minutes relative to the time, and Ar represents the cross-sectional area (cm²) of the sample at 380° C. Here, Lr/Ar can be calculated from a measurement of separately obtained thermal expansion by using the following equation.

$$Lr/Ar = 0.80 \times L(\text{length at room temperature})/A(\text{cross-sectional area at room temperature})$$

The aforementioned PTFE having a melt viscosity of not greater than $7 \times 10^5$ Pa's is a PTFE having a low molecular weight (a low-molecular weight PTFE). The number average molecular weight of the PTFE is preferably not greater than 600 thousand. On the other hand, the lower limit of the number average molecular weight of the PTFE can be, for example, 10 thousand. The number average molecular weight of the PTFE is a value measured according to the method of S. Wu (Polymer Engineering & Science, 1988, Vol. 28, 538, and 1989, Vol. 29, 273).

The low-molecular weight PTFE has a feature of not having fibrillatability, due to its low molecular weight. Presence/absence of fibrillatability of a PTFE can be determined by performing paste extrusion. The reason why paste extrusion is possible is that, normally, a high-molecular weight PTFE has fibrillatability. When an unbaked formed product obtained by paste extrusion does not have substantial strength or elongation, for example, when the elongation is 0% and the formed product is broken if being pulled, fibrillatability can be considered to be absent.

The lower limit of the contained amount of the PTFE in the solid content (nonvolatile component) in the forming material to be subjected to the irradiation step is preferably 50 mass % and more preferably 55 mass %. In addition, the lower limit may be 60 mass %, may be 80 mass %, or may be 90 mass %. When the contained amount of the PTFE in the forming material is less than the lower limit, the obtained PTFE formed product cannot exhibit excellent wear resistance in some cases. On the other hand, the upper limit of the contained amount of the PTFE in the solid content (nonvolatile component) in the forming material may be 100 mass %, but may be 90 mass %, may be 80 mass %, or may be 70 mass %. In addition, when the forming material to be subjected to the irradiation step is a dispersion or a solution, the contained amount of the PTFE can be, for example, not less than 10 mass % and not greater than 60 mass %.

The lower limit of the contained amount of the PTFE in the entire polymer component in the forming material to be subjected to the irradiation step is preferably 50 mass %, preferably 70 mass %, and preferably 90 mass %. When the contained amount of the PTFE in the entire polymer component is not less than the lower limit, a PTFE formed product having more excellent wear resistance can be obtained. On the other hand, the upper limit of the contained amount of the PTFE in the entire polymer component may be 100 mass % or may be 90 mass %.

A component that may be contained in the forming material in addition to the PTFE is the same as the aforementioned other component that may be contained in the PTFE formed product.

The forming material is preferably subjected to the irradiation step after being formed into a desired shape. Examples of the forming include forming into a film shape, and the forming can be carried out by coating. The coating can be performed as coating with a powder coating material using a powdered PTFE (forming material), or can be performed as coating using a PTFE (forming material) that is in a state of being dispersed in water. Since the low-molecular weight PTFE does not have fibrillatability as described above, the forming material can be also effectively used as a powder coating material. These coating can be carried out by publicly known methods.

After the coating with the forming material, a coating film to be subjected to the irradiation step can be obtained by heating (baking) the forming material. The heating temperature can be, for example, not lower than 360° C. and not higher than 420° C. In addition, the heating time can be, for example, not shorter than 10 minutes and not longer than 1 hour.

The above forming can be carried out by extrusion or injection molding. By carrying out the forming by extrusion or injection molding, forming into a desired sliding member or the like can be easily performed. The above extrusion may be melt extrusion or may be paste extrusion. Here, the low-molecular weight PTFE (PTFE having a melt viscosity at 380° C. of not greater than $7\times10^5$ Pa·s) has melt fluidity in a temperature range equal to or higher than the melting point thereof. Therefore, favorable forming can also be carried out by melt extrusion or injection molding.

The irradiation with the ionizing radiation is carried out substantially in the absence of oxygen, in order to prevent oxidation during the irradiation. Specifically, the irradiation with the ionizing radiation can be carried out in a vacuum (5.0E-4 Torr or less) or in an inert gas atmosphere such as nitrogen (oxygen concentration: 100 ppm or less).

The irradiation with the ionizing radiation is carried out after the PTFE is heated to a temperature equal to or higher than the crystalline melting point of the PTFE. Accordingly, molecular movement of the molecular chains become active, and thus efficient crosslinking reaction can be caused. The crystalline melting point of the PTFE depends on the molecular weight thereof and the like, and is, for example, not lower than 320° C. and not higher than 340° C. Therefore, the heating temperature can be, for example, not lower than 320° C. and not higher than 360° C.

Examples of the ionizing radiation to be applied include electron beams, gamma rays, X rays, neutron rays, and high energy ions.

The lower limit of the dose of the ionizing radiation to be applied is preferably 10 kGy, more preferably 30 kGy, and further preferably 50 kGy. On the other hand, the upper limit of the dose of the ionizing radiation to be applied is preferably 2000 kGy, more preferably 1000 kGy, further preferably 400 kGy, much further preferably 200 kGy, and particularly preferably 125 kGy. When the dose is less than the lower limit, sufficient crosslinking reaction does not proceed, and thus a formed product having excellent wear resistance cannot be obtained in some cases. On the other hand, when the dose exceeds the upper limit, the productivity decreases and the wear resistance of the obtained formed product also decreases in some cases.

OTHER EMBODIMENTS

The embodiment disclosed herein is illustrative in all aspects and should be considered not restrictive. The scope of the present invention is not limited by the configuration of the above-described embodiment but is defined by the claims, and is intended to include meaning equivalent to the scope of the claims and all modifications within the scope.

EXAMPLES

Hereinafter, the present invention will be described in more detail by way of Examples. The present invention is not limited to the Examples. Each measurement method and evaluation method are described below.

[Solid Content Concentration of PTFE Dispersion]

A solid content concentration was calculated by an equation: P (solid content concentration)=Z/X×100(%), on the basis of a heating residue Z (g) obtained by heating X (g) of an aqueous dispersion at 150° C. for 3 hours.

[Average Primary Particle Diameter]

A calibration curve of: a transmittance of projected light having a wavelength of 550 nm through an aqueous dispersion having a polymer concentration adjusted to 0.22 mass %, relative to unit length; and an average primary particle diameter determined by measuring a diameter in a fixed direction in a transmission electron micrograph, was created. For an aqueous dispersion to be measured, the transmittance was measured, and an average primary particle diameter was obtained on the basis of the calibration curve.

[Fibrillatability]

Fibrillatability was evaluated according to ASTM D 4895. Specifically, the evaluation is as follows. Fifty grams of a PTFE powder and 10.25 g of hydrocarbon oil ("Isopar G" (registered trademark) manufactured by Exxon), which is an extrusion aid, were mixed in a glass bottle for 3 minutes and aged at room temperature (25±+2° C.) for 1 hour. Next, the obtained mixture was filled into an extrusion die (having a draw angle of 30° and provided with an orifice (orifice diameter: 2.54 mm, orifice length: 2 mm) at a lower end thereof) with a cylinder (inner diameter: 25.4 mm), a load of 1.2 MPa was applied to a piston inserted into the cylinder, and this state was kept for 1 minute. Thereafter, the mixture was immediately extruded through the orifice at a ram speed of 20 mm/min at room temperature. When a continuous strand was obtained and the obtained unbaked formed product has strength, fibrillatability was evaluated to be present. When a continuous strand was not obtained or when a continuous strand was obtained but did not have substantial strength or elongation (for example, the elongation of the strand was 0% and the strand was broken if being pulled), fibrillatability was evaluated to be absent.

[Standard Specific Gravity (SSG)]

The standard specific gravity was measured according to ASTM D 4895.

[Melting Point and Heat of Crystallization]

A first melting point, heat of crystallization, and a second melting point were measured by differential scanning calorimetry. A differential scanning calorimeter ("X-DSC7000" manufactured by SII Nano Technology Inc.) that was calibrated for temperature by using indium and lead as standard samples in advance was used. About 3 mg of a PTFE was put into an aluminum pan (crimp container), the temperature was increased in nitrogen stream of 40 ml/min at a temperature increasing rate of 10° C./min in a temperature range of 230 to 380° C., and the minimum point of a melt peak in the above range was regarded as the first melting point. Next, the temperature was decreased at a cooling rate of 10° C./min in a temperature range of 380 to 230° C., and heat of crystallization in the range was measured. Furthermore, after the temperature was decreased to 230° C., the temperature was increased at a temperature increasing rate of 10° C./min in the temperature range of 230 to 380° C. again, and the minimum point of a melt peak in the range was regarded as the second melting point.

[Melt Viscosity]

Melt viscosities were measured by the method X, the method Y, and the method Z described above in the embodiment.

Polymerization Example 1

A PTFE aqueous dispersion A (PTFE solid content concentration: 25.0 mass %, average primary particle diameter: 0.22 m) was obtained in the same manner as in Preparation Example 2 in Japanese Laid-Open Patent Publication No.

H8-339809 except that the amount of ethane added as a chain transfer agent was 0.22 g. Next, nitric acid was added to the PTFE aqueous dispersion A, and coagulation was caused by applying intense mechanical shearing force, to obtain a powder in a wet state. The obtained powder in the wet state was separated by filtration, washed afresh with purified water, and dried at 150° C., thereby obtaining a PTFE powder A.

Production Example 1

To the PTFE aqueous dispersion A, 18 parts by mass of a nonionic surfactant (clouding point: 63° C.) per 100 parts by mass of the PTFE solid content was added, and the mixture was allowed to stand under normal pressure at 64° C. for 15 hours. Thereafter, the aqueous dispersion was concentrated by removing the supernatant such that the PTFE solid content was 65 mass %. To the concentrated aqueous dispersion, the following compounds "a" to "g" were added such that the following composition was achieved per 100 parts by mass of the PTFE solid content.
  a: nonionic surfactant (HLB: 13.3), 13.5 parts by mass
  b: nonionic surfactant (HLB: 9.5), 2.5 parts by mass
  c: acrylic emulsion, 30.0 parts by mass
  d: alkaline surfactant, 2.1 parts by mass
  e: ammonium octanoate, 2.0 parts by mass
  f: film forming aid containing glycerin as a principal component, 13.8 parts by mass
  g: antifoaming agent containing paraffin-based mixture as a principal component, 4.4 parts by mass
Furthermore, deionized water was added such that the solid content of the PTFE was adjusted to 44.5 mass %, to obtain a coating material A (forming material) containing the PTFE as a principal component.

Polymerization Example 2

A PTFE aqueous dispersion B (PTFE solid content concentration: 25.0 mass %, average primary particle diameter: 0.28 m) was obtained in the same manner as in Preparation Example 2 in Japanese Laid-Open Patent Publication No. H8-339809 except that the amount of ethane added as a chain transfer agent was 0.05 g. Furthermore, a PTFE powder B was obtained by performing the same operation as in Polymerization Example 1.

Production Example 2

A coating material B containing the PTFE as a principal component was obtained, using the PTFE aqueous dispersion B, in the same manner as in Production Example 1.

Polymerization Example 3

A PTFE aqueous dispersion C (PTFE solid content concentration: 24.3 mass %, average primary particle diameter: 0.28 m) was obtained in the same manner as in Polymerization Example 1 in Japanese Translation of PCT International Application No. 2013-528663 except that the amount of ammonium persulfate added as an initiator was 20 mg and the amount of disuccinic acid peroxide added as an initiator was 630 mg. Furthermore, a PTFE powder C was obtained by performing the same operation as in Polymerization Example 1.

Production Example 3

A coating material C containing the PTFE as a principal component was obtained, using the PTFE aqueous dispersion C, in the same manner as in Production Example 1.

Polymerization Example 4

A PTFE aqueous dispersion D (PTFE solid content concentration: 24.3 mass %, average primary particle diameter: 0.28 m) was obtained in the same manner as in Polymerization Example 1 in Japanese Translation of PCT International Application No. 2013-528663 except that the amount of disuccinic acid peroxide added as an initiator was 840 mg. Furthermore, a PTFE powder D was obtained by performing the same operation as in Polymerization Example 1.

Production Example 4

A coating material D containing the PTFE as a principal component was obtained, using the PTFE aqueous dispersion D, in the same manner as in Production Example 1.

Polymerization Example 5

A PTFE aqueous dispersion E (PTFE solid content concentration: 24.3 mass %, average primary particle diameter: 0.30 m) was obtained in the same manner as in Polymerization Example 1 in Japanese Translation of PCT International Application No. 2013-528663 except that the amount of disuccinic acid peroxide added as an initiator was 204 mg. Furthermore, a PTFE powder E was obtained by performing the same operation as in Polymerization Example 1.

Production Example 5

A coating material E containing the PTFE as a principal component was obtained, using the PTFE aqueous dispersion E, in the same manner as in Production Example 1.

Polymerization Example 6

A PTFE aqueous dispersion F (PTFE solid content concentration: 25.9 mass %, average primary particle diameter: 0.32 μm) was obtained in the same manner as in Comparative Example 3 in the description of International Publication No. WO2005/061567. Furthermore, a PTFE powder F was obtained by performing the same operation as in Polymerization Example 1.

Production Example 6

A coating material F containing the PTFE as a principal component was obtained, using the PTFE aqueous dispersion F, in the same manner as in Production Example 1.

Polymerization Example 7

A PTFE aqueous dispersion G (PTFE solid content concentration: 33.2 mass %) was obtained in the same manner as in Example 2 in the description of International Publication No. WO2007/119829. Furthermore, a PTFE powder G was obtained by performing the same operation as in Polymerization Example 1.

Production Example 7

A coating material G containing the PTFE as a principal component was obtained, using the PTFE aqueous dispersion G, in the same manner as in Production Example 1.

[Physical Properties of PTFEs]

For each of the obtained PTFE powders A to G, the fibrillatability, the SSG, the melting points, the heat of crystallization, and the melt viscosities were evaluated or measured. Table 1 shows the results.

TABLE 1

| Measurement items | Unit | PTFE powder A | PTFE powder B | PTFE powder C | PTFE powder D | PTFE powder E | PTFE powder F | PTFE powder G |
|---|---|---|---|---|---|---|---|---|
| Fibrillatability | — | Absence | Absence | Presence | Presence | Presence | Presence | Presence |
| SSG | — | Unmeasurable *1 | Unmeasurable *1 | 2.207 | 2.199 | 2.170 | 2.160 | 2.154 |
| First melting point | °C. | 327.2 | 329.7 | 336.0 | 337.7 | 338.4 | 344.3 | 344.3 |
| Heat of crystallization | mJ/mg | 72.1 | 65.5 | 32.6 | 29.1 | 27.4 | 26.1 | 25.8 |
| Second melting point | °C. | 328.6 | 329.2 | 327.0 | 327.2 | 326.4 | 326.5 | 326.1 |
| Melt viscosity (method X) | Pa·s | $2.7 \times 10^4$ | $3.8 \times 10^5$ | Unmeasurable *2 | Unmeasurable *2 | Unmeasurable *2 | Unmeasurable *2 | Unmeasurable *2 |
| Melt viscosity (method Y) | Pa·s | $2.7 \times 10^4$ | Unmeasurable *3 | Unmeasurable *3 | Unmeasurable *3 | Unmeasurable *3 | Unmeasurable *3 | Unmeasurable *3 |
| Melt viscosity (method Z) | Pa·s | Unmeasurable *1 | Unmeasurable *1 | $5.2 \times 10^{10}$ | $6.7 \times 10^{10}$ | $9.1 \times 10^{10}$ | $1.2 \times 10^{11}$ | $1.4 \times 10^{11}$ |

*1 In the process of producing a specimen to be measured, PTFE flowed in a molten state during baking, and a formed product shape could not be retained.
*2 The melt viscosity was high and slip occurred between a plate and tire sample, so that the measurement was impossible.
*3 The melt viscosity was high and exceeded the measurement upper limit at a flow tester, so that the measurement was impossible.

Examples 1 and 2 and Comparative Examples

PTFE films were obtained as PTFE formed products by the following procedure using the obtained coating materials A to G (PTFE forming materials). An etched aluminum plate having a diameter of 360 mm and a thickness of 1.2 mm was prepared as a base material. Each obtained coating material was applied to a surface of the base material by spraying. After the application, the coating film was baked at 390° C. for 30 minutes by using a thermoregulated bath. The thickness of the baked coating film was within the range of 40 to 50 μm. An electron beam was applied as ionizing radiation to the baked coating film in a nitrogen atmosphere (oxygen concentration: 5 ppm or less) at 340° C. The electron beam was accelerated to 1.03 MeV and applied by electron beam accelerator "Sagatron" manufactured by NHV Corporation. The electron beam was applied at each of doses of 50 kGy, 100 kGy, 150 kGy, 300 kGy, and 1000 kGy. In addition, formed products were obtained without irradiation (dose: 0 kGy). Accordingly, PTFE formed products of formed product Nos. 1 to 24 shown in Table 2 were obtained. Formed product Nos. 6 and 7 correspond to Examples 1 and 2, and the other formed products are Comparative Examples.

[Evaluation]

Each of the obtained PTFE films (PTFE formed products) were evaluated as described below. Table 2 shows the evaluation results. In Table 2, "-" indicates that a PTFE formed product was not produced or not evaluated.

[PV Limit]

A PV limit was measured according to the A method (ring-on-disk type thrust abrasion test) in JIS-K-7218 (1986) (the ring dimensions are as follows). The other conditions are as follows:

Ring-shaped mating member material: S45C,
Ring dimensions: outer diameter 11.6 mm, inner diameter 7.4 mm,
Ring-shaped mating member surface roughness: Ra 0.28 μm,
Testing device: "EFM-III 1010" manufactured by A&D Company, Limited,
Dry (no oil),
Constant speed test (25 m/min).

The film was rotated for 10 minutes under each pressure, and the pressure was increased if the film was not broken. The speed was constantly set to 25 m/min. The pressure was increased to 1 MPa, 5 MPa, and 10 MPa stepwise, and was increased in steps of 10 MPa after reaching 10 MPa. The pressure previous to the pressure at which the film was broken was regarded as a limit pressure, and the product of the limit pressure and the speed (25 m/min) was defined as a PV limit.

[Breaking Strength (Tensile Breaking Strength) and Elongation at Break (Tensile Elongation at Break)]

A breaking strength and an elongation at break were measured according to JIS-K-7161 (1994) by using a tensile compression testing machine ("SV5120MOV" manufactured by Imada Seisakusho Co., Ltd.). The measurement was performed at a tensile rate of 30 mm/min at an inter-chuck distance of 30 mm with a sample width of 10 mm.

[Pencil Hardness]

A pencil hardness was measured according to JIS-K-5600-5-4 (1999). For example, "H to F" indicates that the hardness was an intermediate hardness between H and F.

TABLE 2

| Formed product No. | Coating material (forming material) | Electron beam dose | PV limit (MPa · m/min) | Tensile strength Breaking strength (kg/mm²) | Tensile strength Elongation at break (%) | Pencil hardness Measured value |
|---|---|---|---|---|---|---|
| 1 | A | 0 kGy | — | 1.4 | 11 | >5B |
| — | | 50 kGy | — | — | — | — |
| — | | 100 kGy | — | — | — | — |
| 2 | | 150 kGy | 750 | 1.3 | 84 | B |
| 3 | | 300 kGy | 1375 | 1.4 | 64 | B |
| 4 | | 1000 kGy | 1000 | 1.6 | 28 | B |
| 5 | B | 0 kGy | <25 | 0.8 | 14 | >5B |
| 6 | | 50 kGy | 1950 | 1.4 | 192 | F |
| 7 | | 100 kGy | 1950 | 1.5 | 158 | F |
| 8 | | 150 kGy | 1500 | 1.5 | 272 | F |

TABLE 2-continued

| Formed product No. | Coating material (forming material) | Electron beam dose | PV limit (MPa · m/min) | Breaking strength (kg/mm²) | Elongation at break (%) | Pencil hardness Measured value |
|---|---|---|---|---|---|---|
| 9 |  | 300 kGy | 1125 | 1.4 | 49 | F to HB |
| 10 |  | 1000 kGy | 1250 | 1.8 | 86 | B |
| 11 | C | 0 kGy | — | 1.9 | 207 | HB |
| — |  | 50 kGy | — | — | — | — |
| — |  | 100 kGy | — | — | — | — |
| 12 |  | 150 kGy | 1125 | 1.4 | 53 | H |
| — |  | 300 kGy | — | — | — | — |
| 13 |  | 1000 kGy | 1375 | 1.7 | 31 | HB |
| 14 | D | 0 kGy | — | 2 | 289 | HB |
| — |  | 50 kGy | — | — | — | — |
| — |  | 100 kGy | — | — | — | — |
| — |  | 150 kGy | — | — | — | — |
| 15 |  | 300 kGy | 1000 | 1.5 | 56 | HB |
| 16 |  | 1000 kGy | 1125 | 1.8 | 34 | HB |
| 17 | E | 0 kGy | <25 | 1.9 | 221 | F to HB |
| 18 |  | 50 kGy | 1250 | 1.4 | 59 | F |
| 19 |  | 100 kGy | 1250 | 1.4 | 53 | HB |
| 20 |  | 150 kGy | 1375 | 1.4 | 58 | HB |
| 21 |  | 300 kGy | 1125 | 1.5 | 57 | HB to B |
| 22 |  | 1000 kGy | 750 | 1.7 | 30 | HB |
| — | F | 0 kGy | — | — | — | — |
| — |  | 50 kGy | — | — | — | — |
| — |  | 100 kGy | — | — | — | — |
| — |  | 150 kGy | — | — | — | — |
| 23 |  | 300 kGy | 1125 | 1.4 | 67 | HB |
| — |  | 1000 kGy | — | — | — | — |
| — | G | 0 kGy | — | — | — | — |
| — |  | 50 kGy | — | — | — | — |
| — |  | 100 kGy | — | — | — | — |
| — |  | 150 kGy | — | — | — | — |
| 24 |  | 300 kGy | 875 | 1.5 | 28 | 2B |
| — |  | 1000 kGy | — | — | — | — |

As shown in Table 2, the formed products of formed product Nos. 6 and 7 (Examples 1 and 2) each have a PV limit of not less than 1600 MPa·m/min. The formed products of formed product Nos. 6 and 7 can exhibit favorable durability and the like as a sliding member. These formed products were obtained by irradiating the coating material B, which contains the low-molecular weight PTFE having a melt viscosity at 380° C. of not greater than 7×10⁵ Pa·s, with the ionizing radiation. On the other hand, as shown in Table 2, a formed product having a PV limit of not less than 1600 MPa·m/min could not be obtained from any of the coating materials C to G each containing the PTFE having a melt viscosity exceeding 7×10⁵ Pa·s. As described above, it is shown that in the case where a coating film of a PTFE having a low melt viscosity, that is, a low molecular weight is irradiated with ionizing radiation, higher wear resistance and the like can be exhibited than in the case where a high-molecular weight PTFE is used.

The invention claimed is:

1. A polytetrafluoroethylene formed product that can be used alone as a sliding member, containing, as a principal component, a polytetrafluoroethylene having a crosslinked structure, wherein
the polytetrafluoroethylene formed product alone has a PV limit of not less than 1600 MPa·m/min, and
the PV limit is a value measured according to the A method in JIS-K-7218 (1986).

2. The polytetrafluoroethylene formed product according to claim 1, wherein the polytetrafluoroethylene formed product alone has a PV limit of not less than 1600 MPa·m/min and of not greater than 2500 MPa·m/min.

3. The polytetrafluoroethylene formed product according to claim 1, wherein the polytetrafluoroethylene formed product has a pencil hardness of not less than HB, and
the pencil hardness is a value measured according to JIS-K-5600-5-4 (1999).

4. The polytetrafluoroethylene formed product according to claim 1, wherein the polytetrafluoroethylene formed product has an elongation at break of not less than 100%.

5. A manufacturing method for a polytetrafluoroethylene formed product that can be used alone as a sliding member, the method comprising an irradiation step of irradiating a forming material containing an uncrosslinked polytetrafluoroethylene as a principal component with ionizing radiation under a condition of no oxygen and of a temperature equal to or higher than a crystalline melting point of the uncrosslinked polytetrafluoroethylene, wherein
the uncrosslinked polytetrafluoroethylene has a melt viscosity at 380° C. of not greater than 7×10⁵ Pa·s,
the polytetrafluoroethylene formed product alone has a PV limit of not less than 1600 MPa·m/min, and
the PV limit is a value measured according to the A method in JIS-K-7218 (1986).

6. The manufacturing method for the polytetrafluoroethylene formed product according to claim 5, wherein the uncrosslinked polytetrafluoroethylene has a number average molecular weight of not greater than 600 thousand.

7. The manufacturing method for the polytetrafluoroethylene formed product according to claim 5, wherein the polytetrafluoroethylene formed product alone has a PV limit of not less than 1900 MPa·m/min.

8. The manufacturing method for the polytetrafluoroethylene formed product according to claim 6, wherein the polytetrafluoroethylene formed product alone has a PV limit of not less than 1900 MPa·m/min.

9. The manufacturing method for the polytetrafluoroethylene formed product according to claim 5, wherein the uncrosslinked polytetrafluoroethylene has a melt viscosity at 380° C. of not less than $1 \times 10^5$ Pa·s.

10. The polytetrafluoroethylene formed product according to claim 1, wherein the polytetrafluoroethylene formed product alone has a PV limit of not less than 1900 MPa·m/min.

11. The polytetrafluoroethylene formed product according to claim 2, wherein the polytetrafluoroethylene formed product alone has a PV limit of not less than 1900 MPa·m/min.

12. The polytetrafluoroethylene formed product according to claim 3, wherein the polytetrafluoroethylene formed product alone has a PV limit of not less than 1900 MPa·m/min.

13. The polytetrafluoroethylene formed product according to claim 4, wherein the polytetrafluoroethylene formed product alone has a PV limit of not less than 1900 MPa·m/min.

14. The polytetrafluoroethylene formed product according to claim 1, wherein the polytetrafluoroethylene having the crosslinked structure is a crosslinked product of an uncrosslinked polytetrafluoroethylene, the uncrosslinked polytetrafluoroethylene has a melt viscosity at 380° C. of not less than $1 \times 10^5$ Pa·s and not greater than $7 \times 10^5$ Pa·s.

\* \* \* \* \*